US010173481B2

(12) United States Patent
Wicher et al.

(10) Patent No.: US 10,173,481 B2
(45) Date of Patent: Jan. 8, 2019

(54) CROSS-PLATFORM UNIVERSAL TIRE PRESSURE MONITORING SENSOR

(71) Applicant: Wegmann automotive GmbH & Co. KG, Veitshöchheim (DE)

(72) Inventors: Bartlomiej Wicher, Würzburg (DE); Andreas Riemann, Veitshöchheim (DE)

(73) Assignee: WEGMANN AUTOMOTIVE GMBH & CO. KG, Veitshöchheim (DE)

( * ) Notice: Subject to any disclaimer, the term of this patent is extended or adjusted under 35 U.S.C. 154(b) by 0 days.

(21) Appl. No.: 15/370,891

(22) Filed: Dec. 6, 2016

(65) Prior Publication Data

US 2017/0158000 A1    Jun. 8, 2017

(30) Foreign Application Priority Data

Dec. 7, 2015 (EP) ..................... 15198266

(51) Int. Cl.
*B60C 23/04* (2006.01)
(52) U.S. Cl.
CPC ...... *B60C 23/0455* (2013.01); *B60C 23/0408* (2013.01); *B60C 23/0471* (2013.01); *B60C 23/0479* (2013.01)
(58) Field of Classification Search
None
See application file for complete search history.

(56) References Cited

U.S. PATENT DOCUMENTS

| | | | |
|---|---|---|---|
| 7,688,192 B2* | 3/2010 | Kenny | B60C 23/0408 340/447 |
| 8,756,439 B1 | 6/2014 | Jannson et al. | |
| 2003/0182032 A1* | 9/2003 | McWalter | G07C 5/008 701/33.6 |
| 2009/0033478 A1 | 2/2009 | Deniau et al. | |
| 2014/0165026 A1 | 6/2014 | McIntyre et al. | |
| 2015/0202932 A1 | 7/2015 | Kessler et al. | |

FOREIGN PATENT DOCUMENTS

| | | |
|---|---|---|
| EP | 2 043 054 A1 | 1/2009 |
| EP | 2821260 A1 | 7/2015 |

* cited by examiner

*Primary Examiner* — Mussa A Shaawat
*Assistant Examiner* — Abdhesh K Jha
(74) *Attorney, Agent, or Firm* — Yakov S. Sidorin; Quarles & Brady LLP

(57) ABSTRACT

A tire pressure monitoring sensor comprises an environmental pressure sensor, a non-volatile memory for storing a first program and a second program, a processing unit for executing the first program, a communication module including a wireless transmitter for transmitting at least one parameter indicative of conditions within a tire and a wireless or wired receiver for loading the second program into the non-volatile memory and a battery for powering the sensor. The second program contains a sensor operation description which is used by the first program.

5 Claims, 5 Drawing Sheets

```
/////////////////////// States definitions ///////////////////////

Park //State name. The first state in the list is default.
   // Timing block: measure pressure once every 30s and motion once
   // every second
   {pressureRate = 30, motionRate = 1}
   // Transition block: perform transition to Learn state as soon as
   // motion is detected
   {-> Learn when motionDetected(true)}

Drive
   // Send packet once every 60 seconds
   {pressureRate = 5, motionRate = 10, packetRate = 60}
   // Packet block: first packet field is a byte (0x01), second field
   // is the sensor Unique Identifier and the last one is pressure.
   {0x01 UID PRESSURE}
   {-> Park when motionDetected(false)}

/////////////////// Protocol fields definitions //////////////////

// Unique identifier - 24 bits long
UID{len = 24}

// Gas pressure - 8 bits long, the value of 0 corresponds to 1000
// mbar, 1 bit step corresponds to 50 mbar
PRESSURE{len = 8, min = 1000, resolution = 50}
```

FIG. 5

```
/////////////////////// States definitions ///////////////////////

Park
  {pressureRate = 30, motionRate = 1}
  {-> Learn when motionDetected(true)}

Learn
  {pressureRate = 5, motionRate = 10, packetRate = 30}
  {0x02 UID PRESSURE DIRECTION}
  // Perform transition to Drive state after 300s from entering Learn
  {-> Drive when timeElapsed(300),
  -> Park when motionDetected(false)}

Drive
  {pressureRate = 5, motionRate = 10, packetRate = 60}
  {0x01 UID PRESSURE}
  {-> Park when motionDetected(false)}

Deflation
  // Send packet only once, right after entering the state
  {packetRate = ONCE}
  {0x03 UID PRESSURE}
  // Enter this state from any other state if a pressure difference
  // between two consecutive measurements is greater than 200 mbar
  {<- when pressureDifference(200),
  // Return to previous state after sending the packet (measurements
  // or periodic packet sending were not requested)
  -> PREVIOUS_STATE when done(true)}

//////////////////// Protocol fields definitions ////////////////////

UID{len = 24}
PRESSURE{len = 8, min = 1000, resolution = 50}

// Wheel direction information: 4 bits long, the value of the field
// is 0x2 when rotating clockwise and 0xF otherwise
DIRECTION{len = 4, clockwise = 0x2, countClockwise= 0xF}
```

FIG. 6

CROSS-PLATFORM UNIVERSAL TIRE PRESSURE MONITORING SENSOR

CROSS-REFERENCE TO RELATED APPLICATIONS

This application claims priority from pending European Application No. 15198266.7 filed on Dec. 7, 2015, the disclosure of which is incorporated by reference herein.

BACKGROUND

1. Field of the Invention

The invention relates to tire pressure monitoring sensors for vehicles and specifically to universal tire pressure monitoring sensors which are adaptable to a variety of vehicles and a variety of sensor hardware platforms.

2. Description of Related Art

A tire-pressure monitoring system (TPMS) is an electronic system for monitoring the air pressure inside a pneumatic tire on various types of vehicles. A TPMS reports in near real-time tire-pressure information to the vehicle's control system and to the driver. The TPMS mentioned herein are direct TPMS, which are mounted inside a tire and have at least one wheel sensor (herein called sensor) for measuring the pressure in the tire.

TPMS sensors may be installed by vehicle manufacturers as OEM (Original Equipment Manufacturers) products or they may be installed in workshops for replacement or refurbishment purposes as an after-market (AM) solution. Most car manufacturers use sensors employing a specific protocol to transmit data to a specialized receiver in the vehicle. Furthermore, the sensors may operate differently, for example by transitioning between different modes during their operation, depending on a vehicle manufacturer, model, year of production, make and TPMS manufacturer. These differences influence implementation of the TPMS sensors, that is: triggering conditions for an internal program flow, learning algorithms, timing, communication protocol behavior, data packet content, etc.

In order for a single TPMS sensor to cover most of the TPMS sensor aftermarket (AM) all relevant modes must be supported by the respective AM-TPMS sensor implementation(s). In order to accomplish this goal, one may either implement a multitude of sensor types, each implementing a fixed set of modes, or a universal sensor, which can be either used on all relevant existing vehicles directly, or which can be programmed/modified by installers to support one or more modes. Using a multitude of sensor types is not desirable, as it requires the sensor installers to have a multitude of TPMS sensors on stock. This results in a high initial investment for the installer and the supply chain and makes the sensor selection time consuming. A universal sensor seems to be a much more economical solution.

US 2014/0165026 A1 discloses a method, systems and tools for programming tire pressure monitoring sensors. Vehicle identification information is used to select a suitable program software for the sensor from a database. This is very flexible as new program implementations can be added later to the database. As the full software has to be loaded to the sensor, the programming times are comparatively long, as a low speed communication interface is used. This interface is normally used for transmitting sensor specific data and triggers by the sensor installers. Furthermore, the intense communication would reduce the capacity of the battery built into the sensor. Alternatively, a wired interface may be used. Such a wired interface requires additional hardware like drivers and electrical contacts, which make the sensor susceptible to ESD damage and corrosion at the electrical contact points. The handling of a wired interface is more complex as a cable has to be connected to the sensor prior to programming and disconnected after programming.

US 2009/0033478 A1 discloses a universal tire pressure monitoring sensor. A plurality of selectable programs is stored in the sensor and for adapting the sensor to a specific vehicle, the required program is selected. This allows for a very fast programming, as the correct program has to be only selected. The drawback of this solution is that a large number of programs have to be stored in the sensor which further requires a large overhead of memory, increasing the sensors costs. Alternatively, the memory-limited microcontroller of the TPMS sensor may only be pre-configured for a selection of vehicle models or protocols, which would require to keep a large number of sensors on stock to provide AM coverage. A further disadvantage is that, due to pre-stored programs, no adaption to future requirements is possible. Instead, new sensors have to be developed.

EP 2821260 A1 discloses a method for setting a TPMS sensor by deleting unnecessary encoding procedures. As initially a large number of encoding procedures has to be stored in memory, a comparatively large memory is required or the memory limitation of commercial micro-controllers forces a number of sensors to be stocked which further increases the costs of the sensor. Finally, adaption to new cars is not always possible, unless they fit into an existing scheme. Otherwise a new sensor has to be released.

All the above-mentioned prior art relies on an external programming tool used by the AM installer to modify a sensor by the means of wired or wireless communication. Such a programming tool may have to be modified each time a new revision of sensor hardware platform is released, depending on the implementation of the prior art. For example if a processing unit, antenna, on-board sensor, communication protocol integrated circuit (IC) or other electronic or mechanic component is modified for the sake of price optimization, component production discontinuation, bug fixing, functional improvements, etc.

For that reason modifying a sensor hardware platform requires introduction of new version number of the sensor, thus affecting other parties involved in the sensor after market. Installers, middle-men and sensor producers are affected by a necessity to store a multitude of versions of the sensors. The programming tool producers must be involved by the sensor producers to include the new version of the program. All the parties are affected by extra complexity. Accordingly, sensor versioning results in extra costs, greater handling complexity, time slips and return rates.

These drawbacks discourage the TPMS sensor producers from modifying the hardware platform of the sensors at the pace of technological advances. This results in low dynamics of the sensor market, greater costs of the sensors and lower functional and user safety.

None of the above-mentioned prior art addresses this problem directly.

SUMMARY

The embodiments are based on the object of providing a universal TPMS wheel sensor, which can be manufactured for low costs, allows simple handling and provides large flexibility. More specifically, modifying the hardware components of the sensor (including the processing unit) should not affect in any way any other party involved in the sensor after-market (installers, programming tool producers, salesmen, etc) and it does not require any distinction between old and new hardware versions. The sensor should be adaptable to a large number of vehicles using different TPMS implementations. The sensor memory requirements should be small. The sensor should be future proof and adaptable to new communication protocols. The programming time during sensor installation should be comparatively short. A programming cable of the wire programming interface preferably is not required.

In an embodiment, a TPMS wheel sensor comprises at least one environmental sensing component like a pressure sensor indicating at least one parameter indicative of at least one condition of or within the tire, a processing unit for executing a program, which may be a microcontroller, a tangible non-volatile non-transitory memory for storing a first program (interchangeably referred to herein as a first program code) and a second program (interchangeably referred to herein as a second program code), and a communication module which may comprise, depending on the specifics of implementation, any, of a wireless transmitter, a wireless receiver or a wireless transceiver for forwarding information to a vehicle and/or a programming unit. The information may comprise details about the at least one parameter indicative of at least one condition of or within the tire, for example pressure, temperature, rotation direction, the sensor's battery state, or some information regarding current state machine state It may also enable a wired communication with the programming unit. The sensor preferably has a housing which may be mounted to a rim such that it is held within a tire mounted to the rim. The sensor further comprises a first program which may be an implementation of a Virtual Machine, further comprising a runtime interpreter, which interprets a second program, comprising a Domain Specific Language (DSL) or an Intermediate Language (IL) stored in the non-volatile memory. The IL is generated from the dedicated Domain Specific Language (DSL). The IL is no code, which can be directly executed by a microprocessor. Instead it is platform-independent language, which has to be interpreted by a runtime interpreter. The language design is optimized to simplify programming of TPMS sensor state machines and to produce Intermediate Language (IL) code (byte code) with low memory footprint. The runtime interpreter may comprise at least one of a classic interpreter for interpretation of byte codes, a Just In Time Compiler (JIT), an Abstract Syntax Tree interpreter, an adaptive optimizer, a tracing JIT or a direct interpreter for the non-compiled DLS code.

The sensor contains an implementation of a Virtual Machine, comprising a runtime interpreter, which interprets the IL program in runtime. The IL implementation of the state machines can be stored in the memory during production, and/or it can be loaded in post-issuance by the sensor installer using a dedicated tool. The IL is preferably generated by a compilation of the DSL. Preferably the DSL is a high level language which can easily be handled by humans. For example it may be a graphical or declarative language. The IL is a lowest level language, which may be a byte code and which is directly interpreted by the runtime interpreter in the sensor. There may be any intermediate stages between the DSL and the IL at a lower level which is less readable, but allows for more detailed and optimal implementation. As the IL program is significantly shorter than the full program (as in US 2014/0165026 A1), program loading time to a sensor is reduced significantly. By the IL, the implementation is hardware independent and may be used on different sensor hardware, for example comprising a different processing unit. This allows for a significant flexibility. A DSL developed once may be re-used for different sensor hardware configurations. Also, a hardware modification does not require any software modification. The interpreter design may also permit executing the DSL program directly, thus eliminating the need to compile it to its IL representation. This is not a preferred solution, however, as it would compromise the program readability or memory footprint.

A TPMS sensor configuration system may comprise at least a TPMS sensor comprising at least one environmental sensing component like a pressure sensor indicating at least one parameter indicative of at least one condition of or within the tire, a processing unit for executing a first program, a non-volatile memory for storing a first program and a second program, and a wireless transmitter, a wireless receiver or a wireless transceiver for forwarding information to a vehicle, and a runtime interpreter for interpreting the second program. The second program being in a form of a DSL code or IL code. It further may comprise a compiler to compile the DSL to the IL. There may also be a set of compilers, where a first compiler compiles the DSL to a first intermediate language and a second compiler compiles the first intermediate language to the IL. There may be further intermediate compilers for compiling into further intermediate languages.

In a preferred embodiment, the memory and the processing unit reside on the same chip (inside a microcontroller), although they may also be located on separate chips. At least one IL program may be stored in the memory either during manufacturing or at a later time by sensor installers. Preferably, a dedicated programming tool is provided for installing the IL program. Before use of the sensor, either an IL program is loaded into the sensor's memory or at least one IL program is selected and/or enabled from at least one previously stored IL program in the memory.

In a further embodiment, the TPMS sensor is implemented as a state machine.

In another embodiment, the specification of the system may be shared between sensor producers in order to provide a unified, hardware- and producer-independent method of defining sensor state machines.

A further embodiment relates to a method of operating a tire pressure monitoring sensor. First, an intermediate language or the domain specific language program is loaded into the non-volatile memory of the tire pressure monitoring sensor. Then, the program in the memory is interpreted by a runtime interpreter. The first program may have already been installed at the sensor during manufacturing.

Another embodiment relates a method of configuring a tire pressure monitoring sensor. First an intermediate language or domain specific language program is selected, which fits and/or is adapted to a specific vehicle. In the next step, the program is loaded into a non-volatile memory of the tire pressure monitoring sensor. Alternatively to selecting an intermediate language program, a domain specific language program may be selected and compiled by a compiler to generate the intermediate language program.

BRIEF DESCRIPTION OF THE DRAWINGS

In the following, the invention will be described by way of example, without limitation of the general inventive concept, on examples of embodiment and with reference to the drawings.

FIG. 5 shows a basic example DSL code for tire pressure monitoring.

FIG. 6 shows a more complex example DSL code for tire pressure monitoring.

Figure 1:
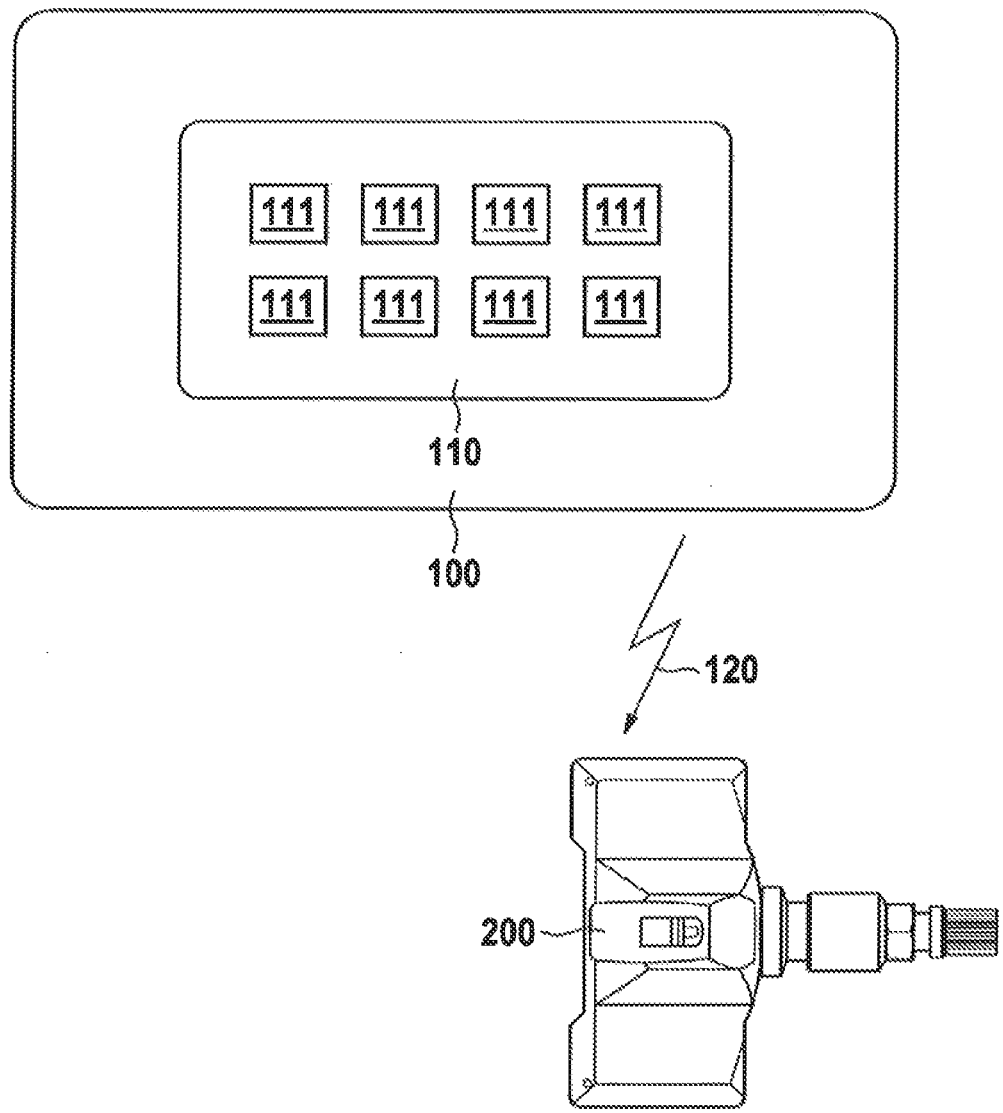
FIG. 1 shows a basic TPMS sensor programming system.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION

In FIG. 1 a basic TPMS programming system is shown. A programming unit 100 may have a display 110, which preferably is a touch screen. The display may provide the user a plurality of options, for example for selecting different car manufacturers, models and years. The programming unit will select the appropriate code for a TPMS sensor and upload it, for example via a wireless communication interface 120 to a TPMS sensor 200.

Figure 2:
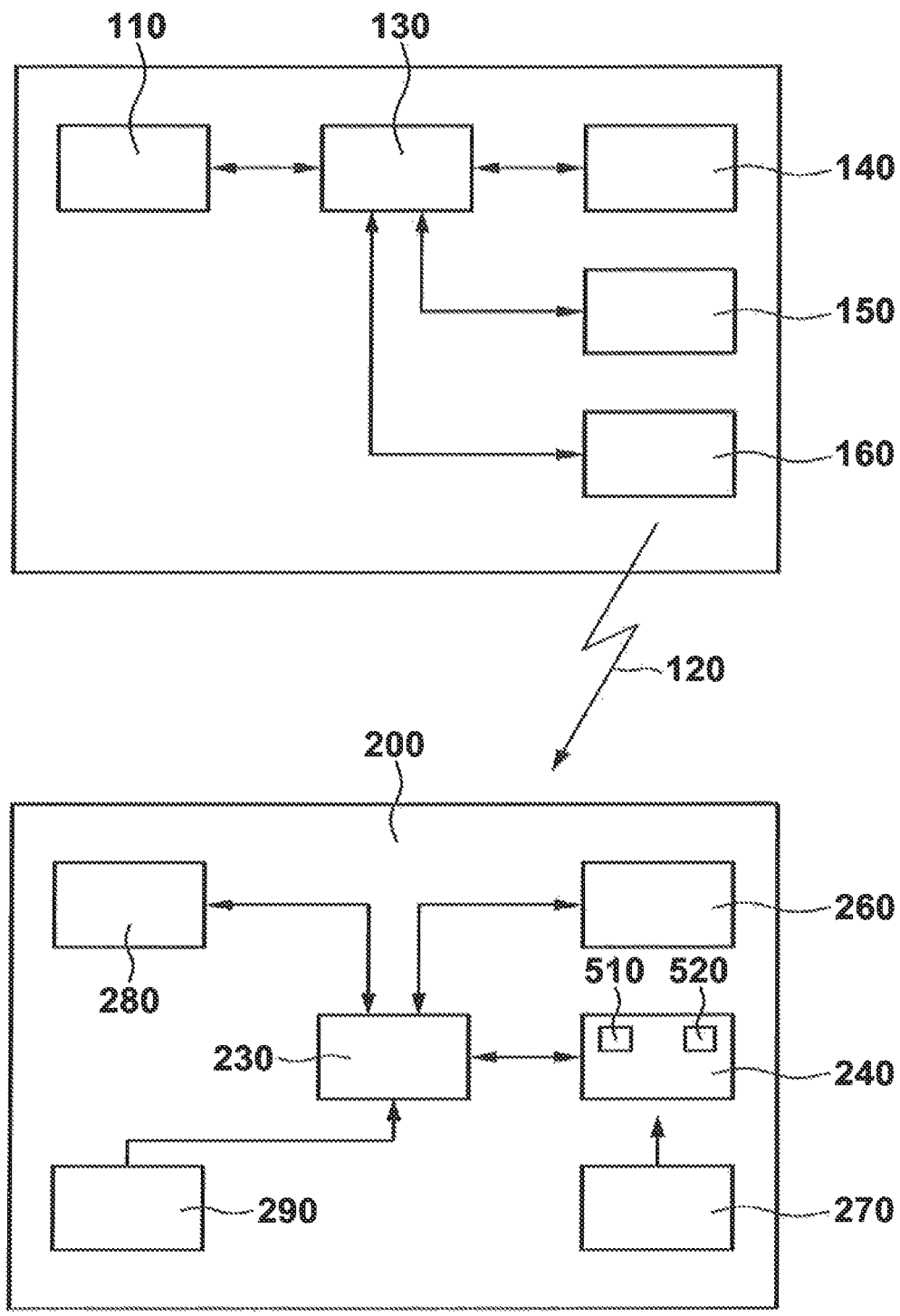
FIG. 2 shows details of a TPMS sensor programming system.

In FIG. 2, more details of a TPMS sensor programming system are shown. The programming unit 100 preferably has a microcontroller or microprocessor 130 which is further connected to a memory 140 or a storage. The memory may be organized as a database and may contain information about vehicles and TPMS sensors. It may be any kind of RAM/ROM, a disk drive or a network connected storage. It is further preferred, if the information about vehicles comprise at least one of car manufacturers, car models, manufacturing years, car identification number and specific TPMS requirements. The information about TPMS sensors may comprise specific DSL code. Furthermore, there may be cross links between specific car manufacturers, models, years or individual cars and specific DSL code. There may also be information about TPMS sensor hardware like manufacturer, model number, manufacturing year and specific hardware capabilities like processing power and memory space.

For communication with and software upload to a TPMS sensor, a communication module 160 may be provided. This communication module preferably is a wireless communication module, but may also be a wire communication module. Although a unique directional communication module is sufficient to upload data to the TPMS sensor, it is preferred to have a bidirectional communication module for transmitting data to a TPMS sensor and receiving information from a TPMS sensor. The received data may be information about the TPMS sensor like manufacturer, type manufacturing year or serial number. Also a checksum or confirmation of uploaded data may be received. It is further preferred, if the programming unit has a display 110, which may be controlled by the microcontroller or microprocessor 130. It is further preferred, if the microcontroller/microprocessor has access to a network interface 150 which may provide a connection to an external computer, an external network or to the Internet. This may be used for downloading and/or updating information about cars, TPMS sensor, the DSL/IL code or any software required for handling and/or compiling such code.

A TPMS sensor 200 preferably comprises a processing unit 230 for controlling the sensor together with a non-volatile memory 240 for storing the first program data and/or code 510 and the second program data and/or code 520. The memory preferably may be a flash, EEPROM, ROM memory or a battery powered RAM. An environmental pressure sensor 280 may be provided for monitoring the gas pressure within the tire and providing such pressure information to the processing unit. There may be at least one auxiliary sensor 290, like a wheel rotation sensor or temperature sensor. For communication with the programming unit 100, at least one communication module 260 may be provided. This communication module enables the TPMS sensor at least to receive code from the programming unit 100 and store it into memory 240. Preferably, the code is an IL code or even a DSL code. For powering the TPMS sensor 200, a battery 270 may be provided.

It is preferred if the same communication module enables communication with a vehicle. Although the communication requirements for uploading the software from the programming unit 100 and during normal operation and tire pressure monitoring are significantly different, they may be handled by the same communication module. The minimum requirement for software upload is a receiver in the communication module to receive the software, whereas the minimum requirement for tire pressure monitoring is a transmitter for transmitting status information to a vehicle. There may be a low power transceiver for these both communication paths. There also may be a high speed high power transmitter. Of course any further combination like a full high-speed transceiver for software upload and a full low-power, low-speed transceiver for pressure monitoring may be provided.

Figure 3:
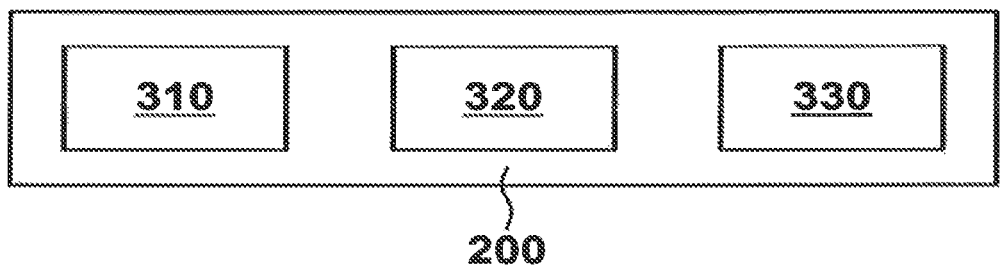
FIG. 3 shows the logic structure of a TPMS sensor.

FIG. 3 shows the logic structure of a TPMS sensor. There may be an upload manager 310 for receiving the second program code and/or data (520) from the programming unit 100 and storing the received data in memory. Furthermore, there is a runtime interpreter 320 for interpreting the uploaded program code. The runtime interpreter may comprise at least one of a classic interpreter for interpretation of byte codes, a Just In Time Compiler (JIT), an Abstract Syntax Tree interpreter, an adaptive optimizer, a tracing JIT or a direct interpreter for the non-compiled DLS code. Finally, there is a system manager 330 for general system management tasks, like power management, which would include setting the processing unit into sleep mode to save energy and waking it up if required. It may also include a timer and/or a task scheduler as well as hardware modules manager (environment sensors, oscillators, converters etc.).

Figure 4:
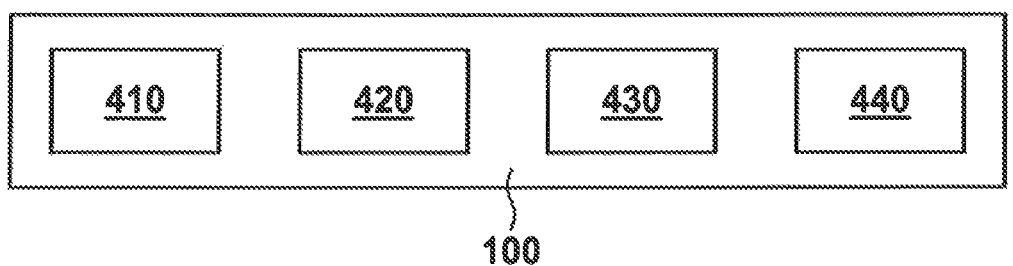
FIG. 4 shows the logic structure of a TPMS sensor programming unit.

FIG. 4 shows the logic structure of a TPMS sensor programming unit. It has an upload manager 410 for uploading data to a TPMS sensor. Furthermore, a database 420 may be provided for storing information about vehicles and/or TPMS sensors and/or related DSL and/or IL code. It may further comprise at least one compiler 430 for compiling DSL code to IL code. A user interface manager 440 may be provided to communicate with a user. There may further be a network manager and a TPMS receiver manager (not shown).

FIG. 5 shows a basic example DSL program of a very simple TPMS sensor. The program consists of two parts, state definitions and protocol fields definitions. The former contains a list of the sensor states, including their characteristics. The first state on the list is a default starting state. Each state definition consists of a state name and two or three blocks:

a timing block, defining which actions should be performed in a given state and how often they should be performed, an optional packet block, defining outgoing packet structure and a transition block, defining permitted transitions to and from a given state as well as conditions triggering these transitions.

The value assigned to pressureRate, motionRate and packetRate, which are the language keywords, corresponds to an interval of periodic pressure measurement, motion detection and packet transmission (in seconds).

The packet structure defined in the packet block can contain numerical literals (like 0x01) and built-in types updated automatically by the underlying system, like sensor Unique Identifier (UID), current pressure (PRESSURE), etc.

The transition to another state is marked with '→' keyword followed by the new state name, 'when' keyword and a condition triggering the transition.

The protocol fields definitions part of the program defines characteristics of the particular fields used to construct packets within the packet blocks of the state definition part. Each built-in value must be characterized by length, and other features specific to the particular built-in type.

Accordingly, after powering-up the sensor, the control will jump to the Park state. Within that state pressure will be measured once every 30 seconds and the sensor will be tested for motion (wheel rotation) once every second. As soon as motion is detected, the control will jump to the Drive state.

In the Drive state the pressure is measured every 5 seconds, motion every 10 seconds and a packet is sent once every minute. The packet contains a byte of value 0x01 followed by 3 bytes long unique identifier obtained from the underlying hardware followed by 1 byte long current pressure information, where resolution is 50 mbar per one bit and the value of 0 corresponds to 1000 mbar. As soon as motion is not detected any more, the control returns to the Park state.

The control can jump from Learn state either to the Drive state, if the time spent in the Learn state is equal to 300 seconds, or to the Park state, if no motion is detected.

The Deflation state is entered from any other state if the pressure difference between two consecutive measurements is greater than or equal to 200 mbar. After the state has been entered, a packet consisting of a byte equal to 0x03 followed by the sensor unique identifier and pressure information is sent. As soon as the packet is sent, the control returns back to the state from which it transited to Deflation.

It will be appreciated to those skilled in the art having the benefit of this disclosure that this invention is believed to provide a tire pressure monitoring sensor. Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

LIST OF REFERENCE NUMERALS 100 programming unit
110 display
111 program options display
120 wireless communication
130 microcontroller/microprocessor
140 memory
150 network interface
160 sensor communication module
200 tire pressure monitoring sensor (TPMS)
230 processing unit
240 non-volatile memory
260 communication module
270 battery
280 environmental pressure sensor
290 auxiliary sensor
310 upload manager
320 runtime interpreter
330 system manager
410 upload manager
420 database
430 compiler
440 user interface manager
510 first program
520 second program

The invention claimed is:

1. A tire pressure monitoring sensor comprising:
a sensor configured to measure at least one parameter indicative of at least one condition within a tire,
a non-volatile memory configured to store a first program code and a second program code,
a processing unit configured to execute the first program code,
a communication module containing a wireless transmitter, the wireless transmitter configured to transmit tire condition related information,
a receiver configured to load the second program code into tangible, non-volatile and non-transitory memory, and
a battery configured to power the sensor,
wherein the second program code comprises an intermediate language (IL) and
the first program code comprises i) a runtime interpreter for interpreting the intermediate language of the second program code, ii) an upload manager configured to load the second program code into said memory, iii) a system manager configured for general system management tasks and including at least one of a power manager, a timer unit, and a task scheduler.

2. A tire pressure monitoring sensor programming system comprising a tire pressure monitoring sensor according to claim 1, wherein a programming unit is provided, the programming unit further comprising:
a microcontroller or microprocessor,
a memory containing information about vehicles and at least one intermediate language (IL) or domain specific language (DSL) program.

3. A tire pressure monitoring sensor programming system according to claim 2, further comprising
at least one compiler configured to compile domain specific language into the at least one intermediate language.

4. A method of operating a tire pressure monitoring sensor, the method comprising the steps of:
   loading an intermediate language program code into non-volatile memory of a tire pressure monitoring sensor, and
   interpreting the intermediate language program code by a runtime interpreter contained in a first program code, said runtime interpreter configured to interpret an intermediate language contained in a second program code,
   wherein the first program code comprises an upload manager configured to load the second program code into said memory, and a system manager configured for general system management tasks and including at least one of a power manager, a timer unit, and a task scheduler.

5. A method of configuring a tire pressure monitoring sensor, the method comprising:
   (i) selecting an intermediate language (IL) program adapted to a specific vehicle and loading the intermediate language program into non-volatile memory of a tire pressure monitoring sensor, Or (ii) selecting a domain specific language (DSL) program adapted to a specific vehicle, compiling the domain specific language into the intermediate language (IL) program and loading the intermediate language program into a non-volatile memory of a tire pressure monitoring sensor, wherein said loading includes loading the intermediate language program with the use of an upload manager contained in a first program code, the first program code further comprising i) a runtime interpreter configured to interpret the IL program, and ii) a system manager configured to perform general system management tasks.

* * * * *